United States Patent
Baldys et al.

(10) Patent No.: US 10,583,766 B2
(45) Date of Patent: Mar. 10, 2020

(54) METHOD AND SYSTEM FOR DETERMINING THE MASS OF A LOAD IN A TIPPER BODY

(71) Applicant: HYVA HOLDING B.V., Alphen aan den Rijn (NL)

(72) Inventors: Marek Baldys, Amsterdam (NL); Maarten Hertog, Utrecht (NL); Jacob Biemond, Bodegraven (NL)

(73) Assignee: HYVA HOLDING B.V. (NL)

( * ) Notice: Subject to any disclaimer, the term of this patent is extended or adjusted under 35 U.S.C. 154(b) by 225 days.

(21) Appl. No.: 15/556,038

(22) PCT Filed: Feb. 26, 2016

(86) PCT No.: PCT/EP2016/054173
§ 371 (c)(1),
(2) Date: Sep. 6, 2017

(87) PCT Pub. No.: WO2016/142194
PCT Pub. Date: Sep. 15, 2016

(65) Prior Publication Data
US 2018/0056841 A1    Mar. 1, 2018

(30) Foreign Application Priority Data

Mar. 6, 2015 (GB) .................................. 1503865.6

(51) Int. Cl.
*B60P 1/28* (2006.01)
*B60P 1/24* (2006.01)
(Continued)

(52) U.S. Cl.
CPC ............... *B60P 1/283* (2013.01); *B60P 1/162* (2013.01); *B60P 1/24* (2013.01); *G01G 19/10* (2013.01); *F15B 15/16* (2013.01); *F15B 15/2815* (2013.01)

(58) Field of Classification Search
CPC .. B60P 1/283; B60P 1/24; B60P 1/162; G01G 19/10; F15B 15/2815; F15B 15/16
See application file for complete search history.

(56) References Cited

U.S. PATENT DOCUMENTS 4,511,974 A * 4/1985 Nakane et al. ...... G01G 19/083
701/124
4,839,835 A * 6/1989 Hagenbuch ............ G08G 1/20
701/50

(Continued)

FOREIGN PATENT DOCUMENTS

AU    2009100034 A4    2/2009
EP       2364877 A1    9/2011
(Continued)

OTHER PUBLICATIONS

Search Report and Written Opinion for applicaiton No. PCT/EP2016/054173 filed Feb. 26, 2016 (11 pages).

*Primary Examiner* — Dale W Hilgendorf

(57) ABSTRACT

There is disclosed a method of determining the mass of a load in a tipper body of a tipper, the tipper includes a tipper body pivotably moveable with respect to a frame with a hydraulic cylinder disposed therebetween and actuatable to pivot the tipper body. The method includes receiving at least one pressure parameter relating to the hydraulic pressure within the hydraulic cylinder at an angular position of the tipper body and at least one angular positional parameter relating to the angular position of the tipper body at the angular position; and determining a mass parameter relating to the mass of a load in the tipper body based on at least the at least one pressure parameter and the at least one angular positional parameter.

19 Claims, 7 Drawing Sheets

(51) Int. Cl.
   *B60P 1/16*      (2006.01)
   *G01G 19/10*     (2006.01)
   *F15B 15/16*     (2006.01)
   *F15B 15/28*     (2006.01)

(56) References Cited

U.S. PATENT DOCUMENTS

| | | | |
|---|---|---|---|
| 5,742,228 A | 4/1998 | Levy | |
| 5,995,888 A * | 11/1999 | Hagenbuch | G01G 19/08 |
| | | | 701/50 |
| 6,858,809 B2 * | 2/2005 | Bender | G01G 19/12 |
| | | | 177/136 |
| 9,464,403 B2 * | 10/2016 | Shatters | G01G 19/10 |
| 2008/0169131 A1 * | 7/2008 | Takeda et al. | G01G 19/10 |
| | | | 177/136 |
| 2010/0026079 A1 * | 2/2010 | Nabeshinna et al. | B60P 1/162 |
| | | | 701/50 |
| 2010/0161185 A1 * | 6/2010 | Marathe et al. | E02F 3/431 |
| | | | 701/50 |
| 2015/0025756 A1 * | 1/2015 | Itai et al. | B60P 1/283 |
| | | | 701/50 |
| 2016/0202111 A1 * | 7/2016 | Fahey et al. | G01G 19/10 |
| | | | 177/141 |

FOREIGN PATENT DOCUMENTS

| | | | |
|---|---|---|---|
| EP | 2781403 | A2 | 9/2014 |
| GB | 2046957 | A | 11/1980 |

* cited by examiner

METHOD AND SYSTEM FOR DETERMINING THE MASS OF A LOAD IN A TIPPER BODY

FIELD

The invention relates to a method and system for determining the mass of a load in a tipper body of a tipper.

BACKGROUND

A tipper truck, sometimes referred to as a dump or dumper truck, is a vehicle that is typically used in the construction industry for transporting aggregate (e.g. gravel or sand). The tipper typically comprises an engine, a driver cab and a trailer. The trailer usually has a trailer chassis or frame with a tipper body, in the form of an open-top cuboidal container, pivotably mounted thereto. A hydraulic cylinder is provided between the frame and the tipper body and can be extended to pivot the tipper body to a tipping position in which the load is emptied from the body. The cylinder can be retracted to lower the tipper body. It should be appreciated that this is merely one form of tipper truck and other types do exist.

It is important that the tipper body is not overloaded as this may make the tipper truck unsafe to drive. It is known to load a tipper body with only a certain number of "scoops" of aggregate in order to prevent the tipper body from being overloaded. However, this is not a particularly accurate method of preventing overloading. It is also known to drive a loaded tipper vehicle onto vehicle weighing scales in order to weigh the load. Whilst this arrangement may be accurate, in many circumstances it may not be convenient or indeed possible to use vehicle weight scales.

It is therefore desirable to provide an improved method and system for determining the mass of a load within a tipper body.

SUMMARY

According to an aspect there is provided a method of determining the mass of a load in a tipper body of a tipper, the tipper comprising a tipper body pivotably moveable with respect to a frame with a hydraulic cylinder disposed therebetween and actuatable to pivot the tipper body, the method comprising: receiving at least one pressure parameter relating to the hydraulic pressure within the hydraulic cylinder at an angular position of the tipper body and at least one angular positional parameter relating to the angular position of the tipper body at the said angular position; and determining a mass parameter relating to the mass of a load in the tipper body based on at least the at least one pressure parameter and the at least one angular positional parameter. The mass parameter may be determined based on at least the at least one pressure parameter, the at least one angular positional parameter and the position of the centre of gravity of the tipper body. The position of the centre of gravity may be along a longitudinal axis of the tipper body. The position of the centre of gravity may be based on an empty tipper body.

The method may comprise pivoting the tipper body away from a resting position and during the movement of the tipper body: monitoring a pressure parameter relating to the hydraulic pressure within the hydraulic cylinder to generate a plurality of pressure parameters; and monitoring an angular positional parameter to generate a plurality of corresponding angular positional parameters; and determining the mass parameter relating to the mass of a load in the tipper body based on at least the plurality of pressure parameters and the plurality of angular positional parameters.

According to an aspect there is provided a method of determining the mass of a load in a tipper body of a tipper, the tipper comprising a tipper body pivotably moveable with respect to a frame with a hydraulic cylinder disposed therebetween and actuatable to pivot the tipper body, the method comprising: receiving a first pressure parameter relating to the hydraulic pressure within the hydraulic cylinder at a first angular position of the tipper body and a first angular positional parameter relating to the angular position of the tipper body at the first angular position; receiving a second pressure parameter relating to the hydraulic pressure within the hydraulic cylinder at a second angular position of the tipper body and a second angular positional parameter relating to the angular position of the tipper body at the second angular position; and determining a mass parameter relating to the mass of the load in the tipper body based on at least the first pressure parameter and the first angular positional parameter and the second pressure parameter and the second angular positional parameter. The method allows the mass of the load within the tipper body to be determined quickly and accurately, irrespective of the distribution of the mass within the tipper body. It will be appreciated that more than two angular positional parameters and two pressure parameters may be used. For example, three angular positional parameters and three pressure parameters could be used. Further, a much larger number (e.g. 50) of corresponding angular positional parameters and pressure parameters could be used.

The term "angular positional parameter" covers any measurable parameter from which the angular position and/or tip angle of the tipper body can be determined. Thus the angular positional parameter does not have to be generated by directly measuring the angular position of the tipper body. For example, the angular positional parameter could be generated by measuring another factor such as the inclination angle of the hydraulic cylinder, the length of the hydraulic cylinder, or the vertical distance between the frame and the lower surface of the tipper body.

The term "pressure parameter" covers any measurable parameter from which the pressure of the hydraulic fluid within the hydraulic cylinder can be determined.

The first and second pressure parameters may be generated by a pressure sensor which measures the hydraulic pressure within the hydraulic cylinder. The pressure sensor may be mounted to the hydraulic cylinder. The pressure sensor could be mounted within a port provided in the hydraulic cylinder. In other embodiments the pressure sensor may be provided within a fluid line connected to the hydraulic cylinder. The pressure sensor could be an electronic pressure arranged to generate an electronic pressure signal, the value of which is related to the hydraulic pressure within the hydraulic cylinder.

The first and second angular positional parameters may be generated by a position sensor. The first and second angular positional parameters may be generated by an inclination sensor. The inclination sensor may measure the inclination of the hydraulic cylinder. The inclination sensor may be mounted to the hydraulic cylinder. The inclination sensor may measure the inclination of the hydraulic cylinder in a plane perpendicular to the pivot axis of the cylinder (i.e. the fore-aft inclination). The inclination sensor may measure the inclination of the tipper body. The inclination sensor may be mounted to the tipper body. The first and second angular positional parameters may be generated by a rotary position sensor. The rotary position sensor may measure the angular position of the hydraulic cylinder about a pivot axis of the hydraulic cylinder. The rotary position sensor may measure the angular position of the tipper body about the pivot axis of the hydraulic cylinder. The mass parameter may be mathematically calculated based on at least the first pressure parameter and the first angular positional parameter and the second pressure parameter and the second angular positional parameter. The position sensor, such an inclination (or tilt) sensor or a rotary position sensor, may be electronic and may be arranged to generate an electronic signal, the value of which is related to the angular position of the tipper body.

The mass parameter may be empirically determined based on at least the first pressure parameter and the first angular positional parameter and the second pressure parameter and the second angular positional parameter. The mass parameter may be expressed as the mass of the load. The first angular position may be different from the second angular position. Both the first angular position and the second angular position (or all of the measured angular positions) may be no greater than 5°, or no greater than 10°, or no greater than 15°, or no greater than 20°. Both the first angular position and the second angular position (or all of the measured angular positions) may be greater than 0°. In both the first angular position and the second angular position (or in all measured angular positions) the tipper body may be pivoted away from a resting position.

The method may further comprise actuating the hydraulic cylinder to cause the tipper body to move from the first angular position to the second angular position. The method may further comprise actuating the hydraulic cylinder to cause the tipper body to move from a resting position to the first angular position. The hydraulic cylinder may be actuated in response to an operator using an operator input device such as a control lever. Alternatively, the hydraulic cylinder may be automatically actuated.

The method may further comprise: receiving an operator input to commence an automatic weighing operation; automatically actuating the hydraulic cylinder to cause the tipper body to move from a resting position to the first angular position; automatically actuating the hydraulic cylinder to cause the tipper body to move from the first angular position to the second angular position; and automatically actuating the hydraulic cylinder to cause the tipper body to move from the second angular position to the resting position.

The distribution of the load in the tipper body may remain substantially constant between the first angular position and the second angular position.

The method may further comprise displaying the mass parameter. The mass parameter may be displayed on a screen.

According to an aspect there is provided a weighing system for determining the mass of a load in a tipper body of a tipper, the tipper comprising a tipper body pivotably moveable with respect to a frame with a hydraulic cylinder disposed therebetween and actuatable to pivot the tipper body, the system comprising: a mass determining module arranged to: receive at least one pressure parameter relating to the hydraulic pressure within the hydraulic cylinder at an angular position of the tipper body and at least one angular positional parameter relating to the angular position of the tipper body at the said angular position; and determine a mass parameter relating to the mass of a load in the tipper body based on at least the at least one pressure parameter and the at least one angular positional parameter. The mass determining module may be arranged to determine the mass parameter based on at least the at least one pressure parameter, the at least one angular positional parameter and the position of the centre of gravity of the tipper body.

The system may further comprise a mass determining module arranged to: monitor a pressure parameter relating to the hydraulic pressure within the hydraulic cylinder to generate a plurality of pressure parameters during movement of the tipper body away from a resting position; and monitor an angular positional parameter to generate a plurality of corresponding angular positional parameters during movement of the tipper body away from a resting position; and determine the mass parameter relating to the mass of a load in the tipper body based on at least the plurality of pressure parameters and the plurality of angular positional parameters.

According to another aspect there is provided a weighing system for determining the mass in a tipper body of a tipper, the tipper comprising a tipper body pivotably moveable with respect to a frame with a hydraulic cylinder disposed therebetween and actuatable to pivot the tipper body, the system comprising: a mass determining module arranged to: receive a first pressure parameter relating to the hydraulic pressure within the hydraulic cylinder at a first angular position of the tipper body and a first angular positional parameter relating to the angular position of the tipper body at the first angular position; receive a second pressure parameter relating to the hydraulic pressure within the hydraulic cylinder at a second angular position of the tipper body and a second angular positional parameter relating to the angular position of the tipper body at the second angular position; and determine a mass parameter relating to the mass of a load in the tipper body based on at least the first pressure parameter and the first angular positional parameter and the second pressure parameter and the second angular positional parameter.

The system may further comprise a pressure sensor arranged to measure the hydraulic pressure within the hydraulic cylinder and generate the first and second pressure parameters.

The system may further comprise a position sensor for generating the first and second angular positional parameters relating to the angular position of the tipper body at first and second angular positions of the tipper body respectively. The position sensor may comprise an inclination sensor. The inclination sensor may be arranged to measure the inclination of the hydraulic cylinder. The inclination sensor may be arranged to measure the inclination of the tipper body. The position sensor may comprise a rotary position sensor. The rotary position sensor may be arranged to measure the angular position of the hydraulic cylinder about a pivot axis of the hydraulic cylinder. The rotary position sensor may be arranged to measure the angular position of the tipper body about the pivot axis of the hydraulic cylinder.

The mass determining module may be arranged to mathematically calculate the mass parameter. The mass determining module may be arranged to empirically determine the mass parameter.

The system may further comprise: an input device arranged to receive an operator input to commence an automatic weighing operation; and a hydraulic cylinder control module arranged to: upon commencement of an automatic weighing operation: automatically actuate the hydraulic cylinder to cause the tipper body to move from a resting position to the first angular position; automatically actuate the hydraulic cylinder to cause the tipper body to move from the first angular position to the second angular position; and automatically actuate the hydraulic cylinder to cause the tipper body to move from the second angular position to the resting position.

The system may further comprise a display arranged to display the mass parameter. The display may comprise a touch-screen which comprises the input device.

According to a further aspect there is provided a tipper comprising: a tipper body pivotably moveable with respect to a frame; a hydraulic cylinder disposed between the frame and the tipper body and actuatable to pivot the tipper body; and a weighing system in accordance with any statement herein for determining the mass of a load in the tipper body. The pressure sensor may be mounted to the hydraulic cylinder. The inclination sensor may be mounted to the hydraulic cylinder. The inclination sensor may be mounted to the tipper body. The tipper may be a tipper vehicle. The input device may be located within the cab of the vehicle. The display may be located within the cab.

According to yet a further aspect there is provided a hydraulic cylinder assembly comprising: a hydraulic cylinder having at least one pivot axis perpendicular to the longitudinal axis of the cylinder; and at least one inclination sensor coupled to the hydraulic cylinder such that it is capable of generating a fore-aft inclination parameter relating to the inclination of the cylinder in a plane perpendicular to the pivot axis.

At least one end of the hydraulic cylinder may be provided with an eye which defines the pivot axis. The hydraulic cylinder assembly may further comprise a pressure sensor coupled to the hydraulic cylinder such that it is capable of generating a pressure parameter relating to the hydraulic pressure within the hydraulic cylinder.

The invention may comprise any combination of the features and/or limitations referred to herein, except combinations of such features as are mutually exclusive.

BRIEF DESCRIPTION OF THE FIGURES

Embodiments of the invention will now be described, by way of example, with reference to the accompanying drawings, in which.

DETAILED DESCRIPTION

Figure 1:
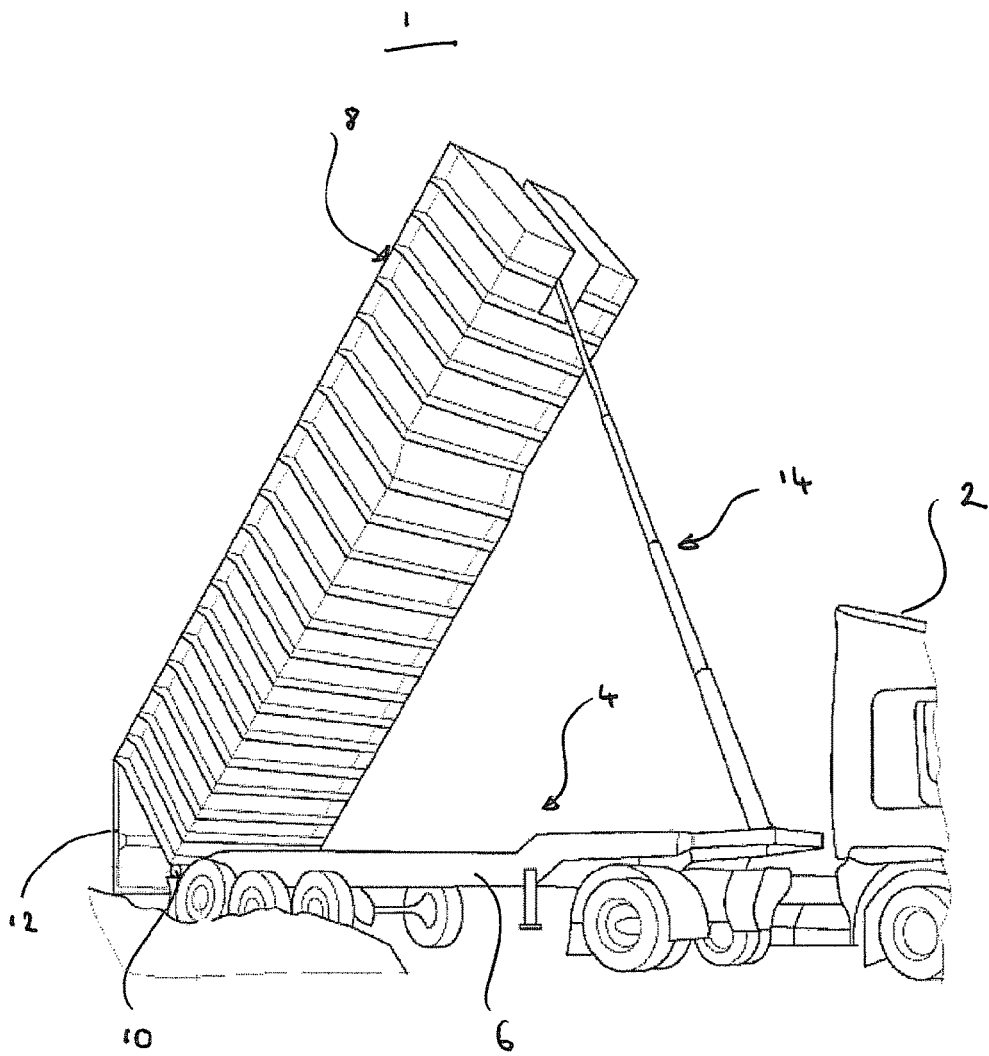
FIG. 1 schematically shows a perspective view of a tipper truck.
Figure 2:
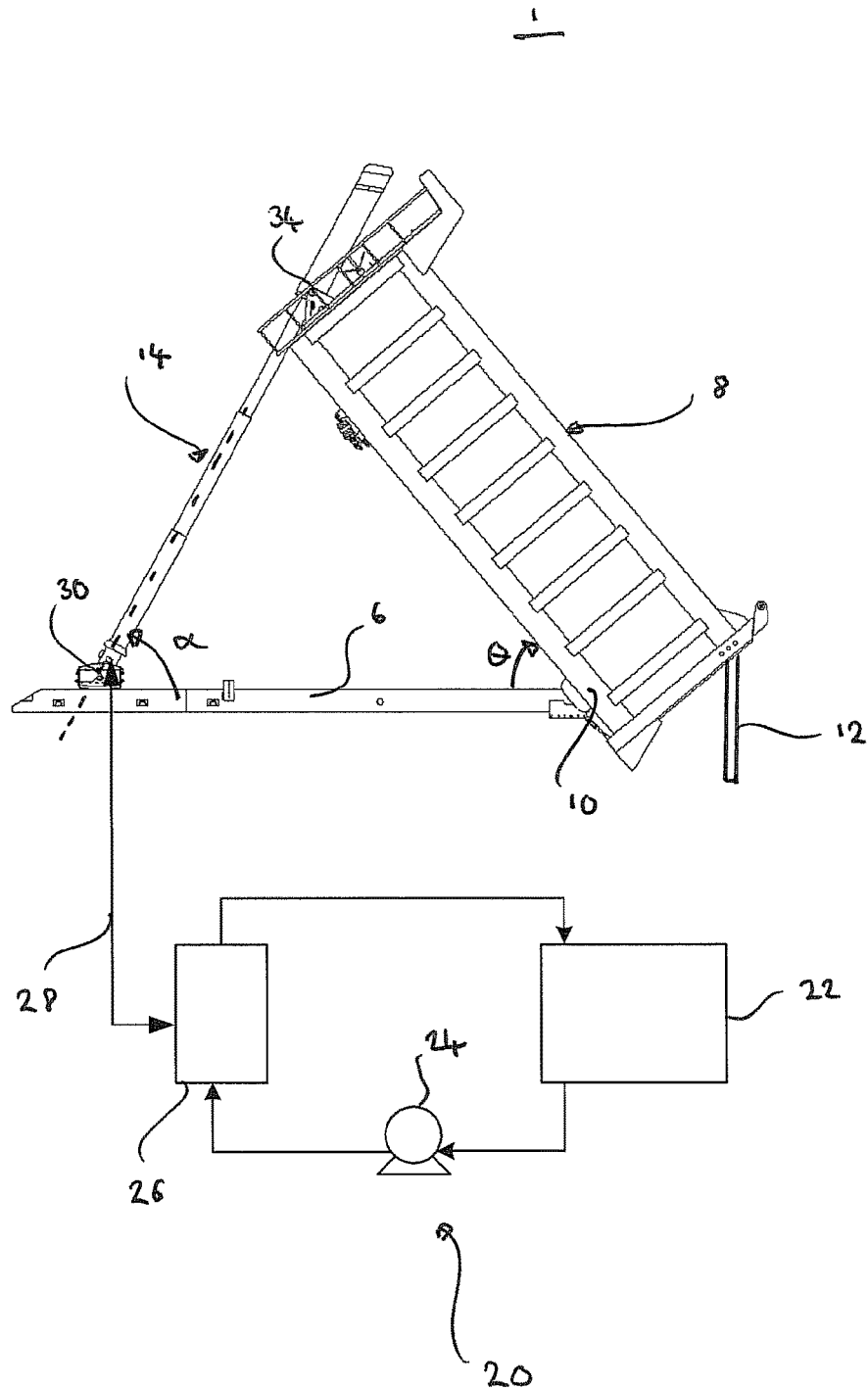
FIG. 2 schematically shows a side view of the tipper truck of FIG. 1 without the tractor.

FIGS. 1 and 2 show a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a transverse axis 10 that is located at the rear of the chassis 6. The tipper body 8 is in the form of a cuboidal container having an open top. The rear panel (or door) 12 of the tipper body 8 is hinged at its upper edge and can be locked and unlocked such that it can be opened to allow the contents of the tipper body 8 to be emptied. A hydraulic cylinder 14 is provided that is pivotably attached at a lower end to the front of the chassis 6 and pivotably attached an upper end to the front of the tipper body 8. The hydraulic cylinder 14 can be extended (as in FIG. 1) to pivot the tipper body 8 about the axis 10 to a fully tipped position in which, with the rear panel 12 unlocked, any load within the tipper body 8 is emptied onto the ground. The tipper body 8 can be lowered back to the resting position under its own weight, thereby causing the cylinder 14 to retract. Since the lower end of the hydraulic cylinder 14 is pivotably fixed to the chassis 6 and the upper end of the hydraulic cylinder 14 is pivotably fixed to the tipper body 8, there is a fixed relationship between the inclination angle α of the cylinder 14 relative to the chassis, and the tip angle θ of the tipper body 8 relative to the chassis 6.

The tipper truck 1 further comprises a hydraulic actuation system 20 for actuating the hydraulic cylinder 14. The hydraulic actuation system 20 comprises an oil tank 22, a pump 24 and a valve assembly 26 that are connected with fluid lines to form a fluid circuit. A pilot system (not shown) is also provided for switching the valve assembly between various configurations. The valve assembly 26 is provided with a port that is hydraulically connected to the hydraulic cylinder 14 with a fluid line 28. The valve assembly 26 can be switched between a number of configurations in order to operate the hydraulic cylinder 14. In a bypass configuration of the valve assembly 26, with the pump 24 running, hydraulic fluid is circulated by the pump 24 from the tank 22, through the valve assembly 26 back to the tank 22. In order to extend the hydraulic cylinder 14 to pivot the tipper body 8 to a fully tipped position (as in FIGS. 1 and 2), the valve assembly 26 is switched to a raising configuration in which the pump 24 pumps hydraulic fluid from the tank 22 into the hydraulic cylinder 14, thus causing it to extend. When the hydraulic cylinder 14 has been sufficiently extended (either fully extended or extended by the desired amount), the valve assembly 26 is returned to a bypass configuration in which, with the pump 24 running, hydraulic fluid is circulated from the tank 22 through the valve assembly 26 back to the tank 22. In the bypass configuration of the valve assembly 26 the fluid line 28 is closed and therefore the cylinder 14 remains in the extended configuration. In this embodiment, the hydraulic actuation system 20 is provided with an automatic knock-off which automatically switches the valve assembly 26 to the bypass configuration when the hydraulic cylinder has been fully extended. The automatic knock-off is in the form of a switch which the body of the hydraulic cylinder 14 triggers when it reaches the fully extended position. The valve assembly 26 is also provided with a pressure relief bypass valve. If the pressure of the hydraulic fluid in the valve assembly 26 exceeds a threshold (which may be due to an excessively heavy load in the tipper body 8) the hydraulic fluid is diverted to the tank 22, rather than being pumped into the hydraulic cylinder 14. This is a safety feature provided to prevent excessively heavy loads from being lifted. In order to lower the hydraulic cylinder 14, the pump 24 is shut off and the valve assembly 26 is switched to a lowering configuration. In this configuration, the fluid line 28 is opened and the cylinder 14 retracts under the weight of the tipper body 8 with the hydraulic fluid being returned to the tank 22.

As will be described in detail below, the tipper truck 1 is provided with a weighing system which allows the load within the tipper body 8 to be weighed.

Figure 3:
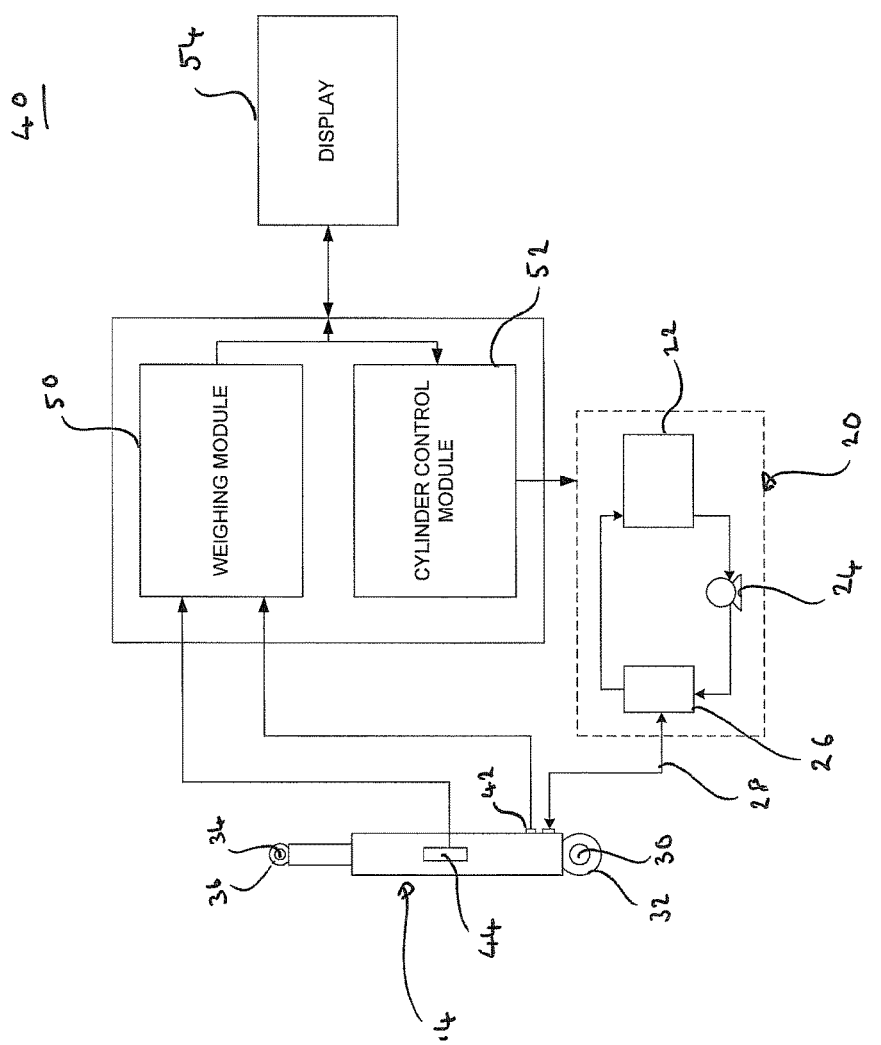
FIG. 3 schematically shows a weighing system for weighing the load in the tipper body of the tipper truck.

FIG. 3 shows the weighing system 40 for weighing the load (i.e. determining the mass) within the tipper body 8. The weighing system 40 comprises a pressure sensor 42 for measuring the pressure of the hydraulic fluid, such as oil, within the hydraulic cylinder 14 and an inclination (or tilt) sensor 44 for measuring the inclination (i.e. the tilt angle) of the hydraulic cylinder 14 in a plane perpendicular to the lower pivot axis 30. The lower pivot axis 30 of the cylinder 14 is defined by the axis of the eye 32 by which the cylinder 14 is pivotably mounted to the chassis 6. Similarly, the upper pivot axis 34 (which is parallel to the lower axis 30) is defined by the axis of the eye 36 by which the cylinder 14 is pivotably mounted to the tipper body 8. The pressure sensor 42 is an electronic pressure transducer that is installed within a port provided in the outer wall of the cylinder 14. The pressure sensor 42 is thus fixed to the hydraulic cylinder 14 and is exposed to the hydraulic fluid within the cylinder 14. The pressure sensor 42 is arranged to generate an electronic signal which is representative of the detected hydraulic pressure (i.e. the pressure of the hydraulic fluid). Thus, the hydraulic pressure within the cylinder 14 can be determined from the electronic signal generated by the pressure sensor 42. The inclination sensor 44 is mounted to the outer surface of the hydraulic cylinder 14 and is positioned such that it can measure the fore-aft (i.e. forwards/backwards) inclination of the hydraulic cylinder 14 in a plane perpendicular to the pivot axis 30. The inclination sensor 44 is arranged to generate an electronic signal which is representative of the inclination angle $\alpha$. In this embodiment, with the truck chassis 6 horizontal, the inclination angle $\alpha$ of the hydraulic cylinder 14 can be determined from the electronic signal generated by the inclination sensor 44. Due to the fixed relationship between the inclination angle and the tip angle, the electronic signal generated by the inclination sensor 44 also relates to the tip angle $\theta$ (i.e. with the truck chassis 6 horizontal the tip angle $\theta$ can be determined from the electronic signal generated by the inclination sensor). It should be appreciated that in other embodiments the inclination sensor 44 could be mounted directly to the tipper body 8 such that it can measure the tip angle of the tipper body 8.

The weighing system 40 further comprises a weighing module 50 (or mass determining module), a cylinder control module 52 and a touch-screen display 54. The pressure sensor 42 and the inclination sensor 44 are connected to the weighing module 50 by appropriate cabling such that the weighing module 50 can obtain the signals generated by the sensors 42, 44. It should be appreciated that in other embodiments the sensors 42, 44 could be wirelessly connected to the weighing module 50. The weighing module 50 is configured such that it can determine (such as by calculation) the mass of the load within the tipper body 8 based on signals received from the sensors 42, 44. The cylinder control module 52 is coupled to the hydraulic actuation system 20 of the tipper truck 1 (via the pilot system) so that it can automatically actuate the hydraulic cylinder 14 to pivotably move the tipper body 8 upon commencement of a weighing operation. The cylinder control module 52 may be connected either wired or wirelessly to the hydraulic actuation system 20 to control the pump 24 and/or the valve assembly 26 via the pilot system.

The touch-screen display 54 is connected to both the weighing module 50 and the cylinder control module 52. The touch-screen 54 serves as an operator input device by which an operator can commence a weighing operation, and also serves as a display which can display the mass of the load in the tipper body 8 determined by the weighing module 50. In this embodiment the touch-screen display 54 is installed in the dashboard of the tractor 2 such that it is easily accessible and visible by an operator. However, in other embodiments it could be located externally, or it could be in the form of a wireless hand-held device (e.g. a smartphone or a tablet). If the touch-screen 54 is provided by a portable wireless device, such as a smartphone or tablet, it could also incorporate the weighing module 50 and the cylinder control module 52 and could communicate wirelessly with the sensors 42, 44 and hydraulic control system 20.

Figure 4:
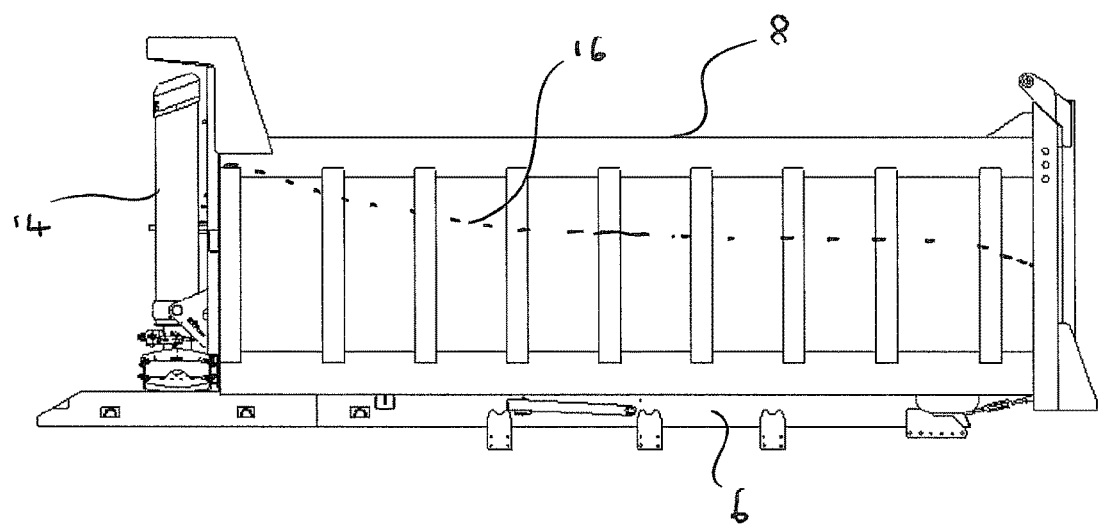
FIG. 4 schematically shows a tipper truck with the tipper body in a resting position.
Figure 5:
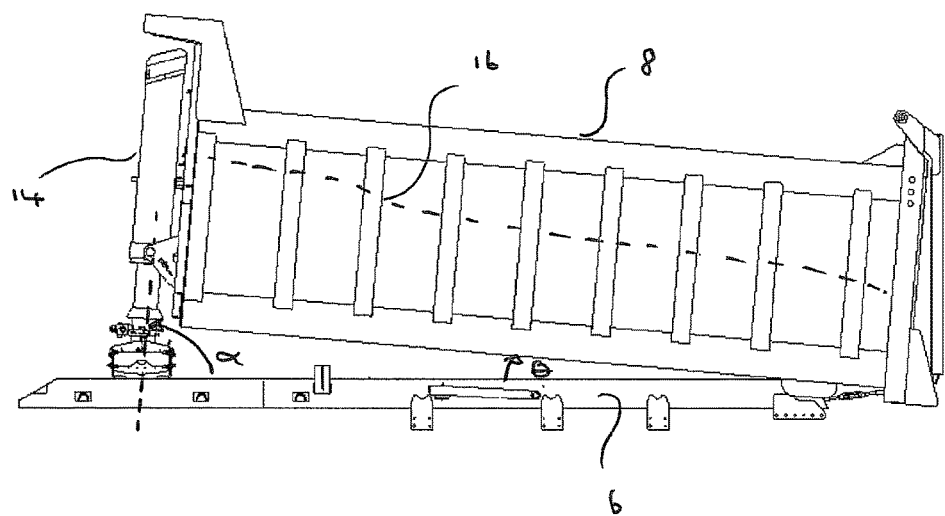
FIG. 5 schematically shows a tipper truck with the tipper body in a first angular position.
Figure 6:
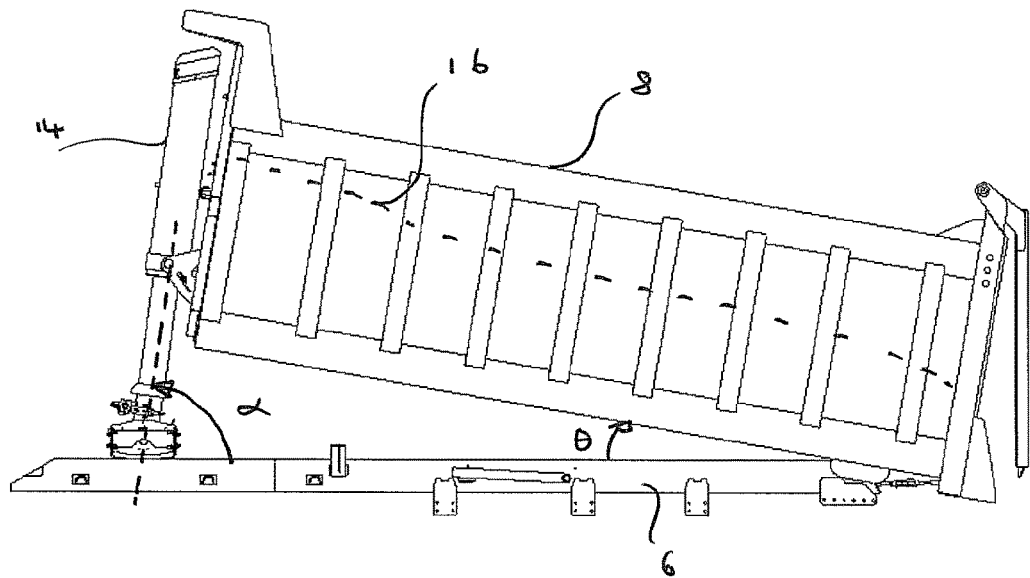
FIG. 6 schematically shows a tipper truck with the tipper body in a second angular position.

A weighing operation will now be described with reference to FIGS. 4, 5 and 6.

Before commencing a weighing operation the tipper truck 1 is driven to a location where the chassis 6 is substantially horizontal. Initially, the tipper body 8 containing a load 16 (such as sand) is in a resting position (FIG. 4). In the resting position of the tipper body 8 it rests on the chassis 6 of the trailer 4 such that the load is transferred directly to the chassis 6. Therefore, in the resting position no load is transferred through the hydraulic cylinder 14. As shown in FIG. 4, the load 16 may be unevenly distributed such that the centre of gravity of the load does not coincide with the centre of the tipper body 8. In order to commence a weighing operation in which the load 16 within the tipper body is weighed (i.e. the mass of the load is determined) an operator presses the appropriate button on the touch-screen display 54. In response to this, the cylinder control module 52 communicates with the hydraulic actuation system 20 to automatically actuate the hydraulic cylinder 14 to extend it. This causes the tipper body 8 to be pivoted about the axis 10 from the resting position to a first angular position (FIG. 5). In this embodiment, the first angular position is approximately a 5° tip angle with respect to the horizontal chassis 6. Of course, the tip angle could be less than this. In the first angular position, since the tipper body 8 is pivoted away from the chassis 6, load is transferred through the hydraulic cylinder 14 which pressurises the hydraulic fluid within the cylinder 14. At the first angular position, the weighing module 50 registers the value of the pressure signal generated by the pressure sensor 42 (first pressure parameter) and registers the value of the inclination signal generated by the inclination sensor 44 (first angular positional parameter). The first pressure parameter relates to the pressure of the hydraulic fluid within the cylinder 14. The weighing module 50 may calculate the actual hydraulic pressure in MPa, but this is not essential. The first angular positional parameter is based on the inclination of the cylinder 14, but due to the fixed relationship between the cylinder 14 and the tipper body 8, it also relates to the tip angle (i.e. the angular position of the tipper body 8). The hydraulic cylinder 14 is then automatically actuated to further extend the hydraulic cylinder 14. This causes the tipper body 8 to be pivoted about the axis 10 from the first angular position to a second angular position (FIG. 6). In this embodiment the second angular position is approximately a 10° tip angle with respect to the horizontal chassis 6. At the second angular position, the weighing module 50 registers the value of the pressure signal generated by the pressure sensor 42 (second pressure parameter) and registers the value of the inclination signal generated by the inclination sensor 44 (second angular positional parameter). The hydraulic cylinder 14 is then automatically actuated (e.g. by opening a valve) to return the tipper body 8 to the resting position (FIG. 4). It should be noted that the general distribution of the load within the tipper body 8 remains substantially constant between the resting position (FIG. 4), the first angular position (FIG. 5) and the second angular position (FIG. 6) (i.e. the load does not move within the tipper body 8).

The weighing module 50 uses the first pressure parameter, the first angular positional parameter, the second pressure parameter and the second angular positional parameter to determine the mass of the load within the tipper body 8. The mass determined may be expressed in kilograms or tonnes, for example. The mass of the load within the tipper body 8 is then output to the display 54 such that it can be viewed by an operator. The weighing module 50 may either mathematically calculate the mass of the load, or it may determine the mass empirically using a database or look-up table. In certain embodiments, an alert is output to the display 54 (or other display) if the determined mass exceeds a threshold value.

In order to be able to determine the mass, the weighing module 50 may be calibrated for the specific tipper truck 1. For example, the body length and weight of the tipper body 8 may be programmed into the weighing module 50. Further values may also be programmed into the weighing module such as the distance between the pivot axis 10 of the tipper body 8 and the lower pivot axis 30 of the cylinder 14, and the distance between the pivot axis 10 of the tipper body 8 and the upper pivot axis of the cylinder 14. These values, and others, such as the position of the centre of gravity of the empty tipper body, may be used to determine the mass of the load.

The weighing module 50 may make various assumptions in order to determine the mass of the load. For example, the weighing module 50 may assume that the chassis 6 is horizontal. In other embodiments the weighing module 50 may make an assumption regarding the height of the centre of gravity of the load within the tipper body.

If the chassis 6 is not horizontal, the weighing system 40 may be able to determine the inclination angle of the chassis 6, and may use this value to correct for any inclination. For example, the chassis 6 may be provided with an inclination sensor arranged to generate a signal indicative of the inclination angle. In other arrangements, the signal generated by the inclination sensor 44 attached to the hydraulic cylinder 14 may be used to determine the inclination angle of the chassis 6. For example, with the tipper body 8 in the resting position (FIG. 4), the signal generated by the inclination sensor 44 may be used to calculate the inclination angle of the chassis 6 based on the known inclination angle of the hydraulic cylinder 14 with the chassis 6 horizontal.

In order to improve the accuracy of the mass of the load determined by the weighing module 50, a third set of values (i.e. a third pressure parameter and a third angular positional parameter) may be determined at a third angular position of the tipper body 8, and these values may be used by the weighing module 50. In yet other embodiments, a much larger set of values may be used to determine the mass of the load within the tipper body 8. For example, the tipper body 8 may be pivoted from a resting position towards a fully tipped position and the weighing module 50 may continuously sample/monitor (or receive) the pressure parameter (e.g. the output from the pressure sensor) and the angular positional parameter (e.g. the output from the inclination sensor). The weighing module 50 may use these sampled sets of values to determine the mass of the load. Once the weighing module 50 has determined the mass this may be output on the display 54. Thus, the weighing module 50 may use a large number (for example 100) sets of values of the pressure parameter and the angular position parameter in order to determine the mass. Of course, it should be appreciated that any other parameters may also be used in addition to the pressure parameter and the angular positional parameter in order to determine the mass of the load.

In another embodiment the weighing module 50 may use a single pressure parameter and a single angular positional parameter at a single angular position (e.g. with the tipper body 8 just lifted away from the chassis) to determine the mass parameter. The weighing module 50 may also receive (or be pre-programmed with) the position of the centre of gravity of the tipper body 8 in order to determine the mass parameter. In this arrangement, it may be assumed that the load within the tipper body 8 is evenly distributed. The position of the centre of gravity may be along the longitudinal axis of the tipper body. The position of the centre of gravity may be for the tipper body 8 when empty, or it may be estimated when full, for example.

In the embodiment described above the hydraulic cylinder 14 is automatically actuated by the cylinder control module 52 to move the tipper body 8 between a resting position, a first angular position and a second angular position. However, in an alternative embodiment the hydraulic cylinder 14 could be actuated by an operator using standard controls. For example, the operator may press a button on the display 54 to commence a weighing operation. The display 54 may then instruct the operator to move the tipper body 8 to a first angular position. When this has been done the operator may press a button on the display 54, causing a first pressure parameter and a first angular positional parameter to be registered by the weighing module 50. The display 54 may then instruct the operator to move the tipper body 8 to a second angular position. Again, when this has been done the operator may press a button on the display 54, causing a second pressure parameter and a second angular positional parameter to be registered by the weighing module 50. The weighing module 50 may then determine the mass of the load and output this to the display 54.

In another embodiment, after the operator has pressed a button to commence a weighing operation, the cylinder 14 may be automatically actuated, or actuated in response to an operator controlling a lever, and the pressure signal and the inclination signal may be continuously monitored and registered by the weighing module 50. The weighing module 50 may then use the monitored signals, such as by obtaining a number of pairs of values, to determine the mass of the load.

It has been described above that the angular positional parameter is generated by an inclination sensor attached to the hydraulic cylinder 14. However, other suitable sensors could be used. For example, an inclination sensor could be attached to the tipper body 8 to measure the angular position of the tipper body. Further, a rotary position sensor could be used to measure the amount of rotation at either the pivot axis 10 of the tipper body 8, or the lower or upper pivot axes 30, 34 of the hydraulic cylinder 14. The signals generated by these sensors can all be related to the angular position of the tipper body (either with respect to the chassis 6 or horizontal). Further, a linear position sensor could be used to monitor the length of the hydraulic cylinder 14. Such a sensor could include a Hall effect sensor, for example. The signal generated by the linear position sensor could again be used to determine the angular position of the tipper body 8. In another arrangement, a distance sensor could be provided to measure the vertical distance between the frame and the lower front edge (i.e. the raised edge) of the tipper body 8. Such a sensor would generate an angular positional parameter as the output of the sensor relates to the angular position of the tipper body 8.

As opposed to providing the pressure sensor 42 in a port in the wall of the hydraulic cylinder 14, the pressure sensor could be provided in the fluid line 28 connecting the valve assembly 26 to the cylinder 14. In essence, the pressure sensor 42 could be provided at any suitable position in the hydraulic system where it can detect the hydraulic pressure within the cylinder 14.

Figure 7:
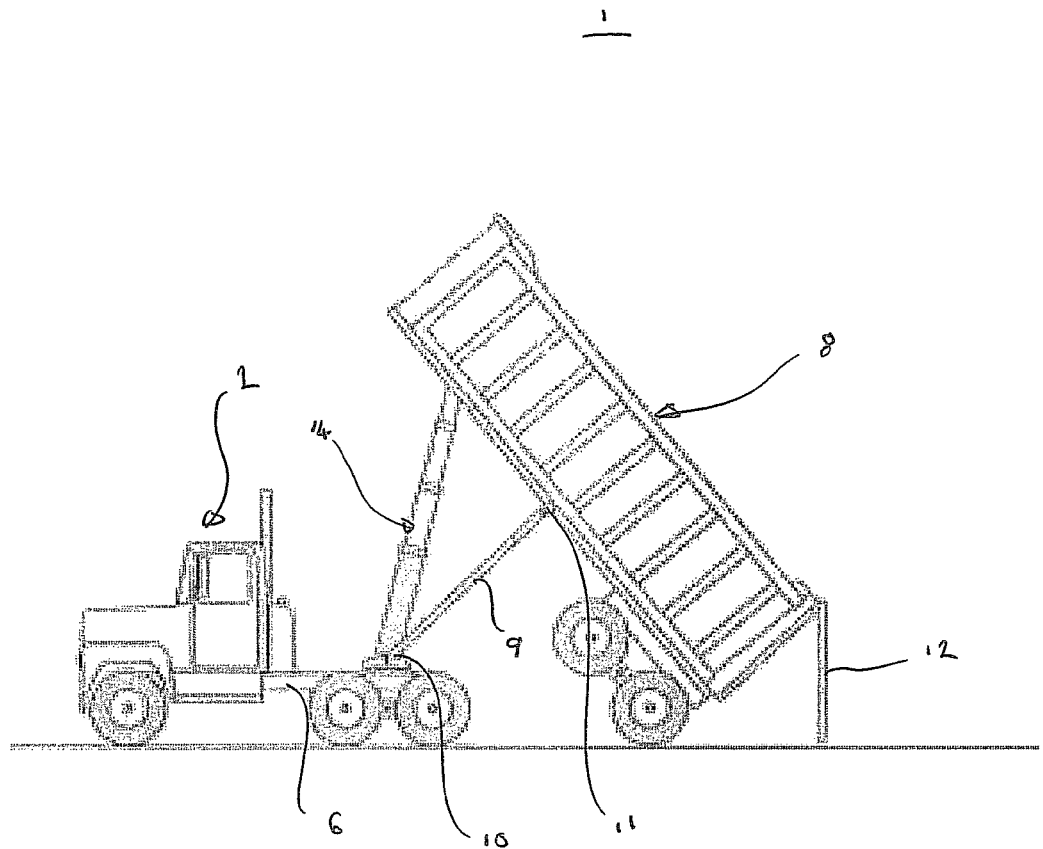
FIG. 7 schematically shows an alternative tipper truck.

It should be appreciated that the system could be used with any suitable type of tipper truck in which a tipper body 8 can be pivoted or moved by a hydraulic cylinder. For example, as shown in FIG. 7, the tipper truck 1 may comprises a tractor 2 having a frame 6 with a hydraulic cylinder 14 connected between the frame 6 and the tipper body 8. The tipper truck 14 further comprises a drawbar 11 that is pivotably connected at a first end to the frame 6 at a first pivot axis 10 and at a second end to the tipper body 8 at a second pivot axis 11. In order to pivot the tipper body 8 from a resting position (not shown) to the fully tipped position (FIG. 7), the hydraulic cylinder 14 is extended which causes the tipper body 8 to pivot clockwise (in FIG. 7) with respect to the frame 6 about the pivot axis 10, and with respect to the drawbar 9 about the pivot axis 11. It should also be appreciated that in order to measure the angular position (i.e. tip angle) of the tipper body 8 the inclination angle of the drawbar 9 could be measured since there is a fixed relationship between this angle and the tip angle (and the inclination angle of the hydraulic cylinder 14).

The weighing system 40 may be one of many intelligent systems that the tipper truck 1 is provided with and could therefore be combined with any suitable system for providing information regarding the tipper vehicle and/or the load carried by the tipper body. If multiple intelligent systems are provided, they may share the same display or processors, for example.

Some aspects of the above-described apparatus, system and methods, may be embodied as machine readable instructions such as processor control code, for example on a non-volatile carrier medium such as a disk, CD- or DVD-ROM, programmed memory such as read only memory (Firmware), or on a data carrier such as an optical or electrical signal carrier. For some applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Veriolog™ or VHDL (Very high speed integrated circuit Hardware Description Language). The code may be distributed between a plurality of coupled components in communication with one another. Where appropriate, embodiments may also be implemented using code running on a field-(re) programmable analogue array or similar device in order to configure analogue hardware.

For the avoidance of doubt, the present disclosure extends to the subject matter disclosed in the following numbered paragraphs or 'Paras':

1. A method of determining the mass of a load in a tipper body of a tipper, the tipper comprising a tipper body pivotably moveable with respect to a frame with a hydraulic cylinder disposed therebetween and actuatable to pivot the tipper body, the method comprising:
receiving at least one pressure parameter relating to the hydraulic pressure within the hydraulic cylinder at an angular position of the tipper body and at least one angular positional parameter relating to the angular position of the tipper body at the said angular position; and
determining a mass parameter relating to the mass of a load in the tipper body based on at least the at least one pressure parameter and the at least one angular positional parameter.

2. A method according to Para 1, wherein the mass parameter is determined based on at least the at least one pressure parameter, the at least one angular positional parameter and the position of the centre of gravity of the tipper body.

3. A method according to Para 1 or 2, wherein the method comprises:
pivoting the tipper body away from a resting position and during the movement of the tipper body:
monitoring a pressure parameter relating to the hydraulic pressure within the hydraulic cylinder to generate a plurality of pressure parameters; and
monitoring an angular positional parameter to generate a plurality of corresponding angular positional parameters; and
determining the mass parameter relating to the mass of a load in the tipper body based on at least the plurality of pressure parameters and the plurality of angular positional parameters.

4. A method according to any preceding Para, wherein the or each pressure parameter is generated by a pressure sensor which measures the hydraulic pressure within the hydraulic cylinder.

5. A method according to Para 4, wherein the pressure sensor is mounted to the hydraulic cylinder.

6. A method according to any preceding Para, wherein the or each angular positional parameter is generated by a position sensor.

7. A method according to Para 6, wherein the or each angular positional parameter is generated by an inclination sensor.

8. A method according to Para 7, wherein the inclination sensor measures the inclination of the hydraulic cylinder.

9. A method according to Para 8, wherein the inclination sensor is mounted to the hydraulic cylinder.

10. A method according to Para 7, wherein the inclination sensor measures the inclination of the tipper body.

11. A method according to Para 10, wherein the inclination sensor is mounted to the tipper body.

12. A method according to Para 6, wherein the or each angular positional parameters is generated by a rotary position sensor.

13. A method according to Para 12, wherein the rotary position sensor measures the angular position of the hydraulic cylinder about a pivot axis of the hydraulic cylinder.

14. A method according to Para 12, wherein the rotary position sensor measures the angular position of the tipper body about the pivot axis of the hydraulic cylinder.

15. A method according to any preceding Para, wherein the mass parameter is mathematically calculated based on the at least one pressure parameter and the at least one angular positional parameter.

16. A method according to any of Paras 1-14, wherein the mass parameter is empirically determined based on the at least one pressure parameter and the at least one angular positional parameter.

17. A method according to any preceding Para, wherein the method comprises:
receiving a first pressure parameter relating to the hydraulic pressure within the hydraulic cylinder at a first angular position of the tipper body and a first angular positional parameter relating to the angular position of the tipper body at the first angular position;
receiving a second pressure parameter relating to the hydraulic pressure within the hydraulic cylinder at a second angular position of the tipper body and a second angular positional parameter relating to the angular position of the tipper body at the second angular position; and determining the mass parameter relating to the mass of the load in the tipper body based on at least the first pressure parameter and the first angular positional parameter and the second pressure parameter and the second angular positional parameter.

18. A method according to Para 17, wherein the first angular position is different from the second angular position.

19. A method according to Para 17 or 18, wherein both the first angular position and the second angular position are no greater than 10°.

20. A method according to any of Paras 17-19, wherein both the first angular position and the second angular position are greater than 0°.

21. A method according to any of Paras 17-20, wherein in both the first angular position and the second angular position the tipper body is pivoted away from a resting position.

22. A method according to any of Paras 17-21, further comprising actuating the hydraulic cylinder to cause the tipper body to move from the first angular position to the second angular position.

23. A method according to any of Paras 17-22, further comprising actuating the hydraulic cylinder to cause the tipper body to move from a resting position to the first angular position.

24. A method according to any preceding Para, further comprising:
receiving an operator input to commence an automatic weighing operation;
automatically actuating the hydraulic cylinder to cause the tipper body to move from away from a resting position.

25. A method according to Para 24 when appended to any of Paras 17-23, further comprising:
automatically actuating the hydraulic cylinder to cause the tipper body to move from away from a resting position to the first angular position;
automatically actuating the hydraulic cylinder to cause the tipper body to move from the first angular position to the second angular position; and
automatically actuating the hydraulic cylinder to cause the tipper body to move from the second angular position to the resting position.

26. A method according to any preceding Para, further comprising displaying the mass parameter.

27. A weighing system for determining the mass of a load in a tipper body of a tipper, the tipper comprising a tipper body pivotably moveable with respect to a frame with a hydraulic cylinder disposed therebetween and actuatable to pivot the tipper body, the system comprising:
a mass determining module arranged to:
receive at least one pressure parameter relating to the hydraulic pressure within the hydraulic cylinder at an angular position of the tipper body and at least one angular positional parameter relating to the angular position of the tipper body at the said angular position; and
determine a mass parameter relating to the mass of a load in the tipper body based on at least the at least one pressure parameter and the at least one angular positional parameter.

28. A system according to Para 27, wherein the mass determining module is arranged to determine the mass parameter based on at least the at least one pressure parameter, the at least one angular positional parameter and the position of the centre of gravity of the tipper body.

29. A system according to Para 27 or 28, further comprising:
a mass determining module arranged to:
monitor a pressure parameter relating to the hydraulic pressure within the hydraulic cylinder to generate a plurality of pressure parameters during movement of the tipper body away from a resting position; and
monitor an angular positional parameter to generate a plurality of corresponding angular positional parameters during movement of the tipper body away from a resting position; and
determine the mass parameter relating to the mass of a load in the tipper body based on at least the plurality of pressure parameters and the plurality of angular positional parameters.

30. A system according to any of Paras 27-29, further comprising a pressure sensor arranged to measure the hydraulic pressure within the hydraulic cylinder and generate the or each pressure parameters.

31. A system according to any of Paras 27-30, further comprising a position sensor for generating or each angular positional parameter relating to the angular position of the tipper body.

32. A system according to Para 31, wherein the position sensor comprises an inclination sensor.

33. A system according to Para 32, wherein the inclination sensor is arranged to measure the inclination of the hydraulic cylinder.

34. A system according to Para 32, wherein the inclination sensor is arranged to measure the inclination of the tipper body.

35. A system according to Para 31, wherein the position sensor comprises a rotary position sensor.

36. A system according to Para 35, wherein the rotary position sensor is arranged to measure the angular position of the hydraulic cylinder about a pivot axis of the hydraulic cylinder.

37. A system according to Para 35, wherein the rotary position sensor is arranged to measure the angular position of the tipper body about the pivot axis of the hydraulic cylinder.

38. A system according to any of Paras 27-37, wherein the mass determining module is arranged to mathematically calculate the mass parameter.

39. A system according to any of Paras 27-37, wherein the mass determining module is arranged to empirically determine the mass parameter.

40. A system according to any of Paras 27-39, wherein the mass determining module is arranged to
receive a first pressure parameter relating to the hydraulic pressure within the hydraulic cylinder at a first angular position of the tipper body and a first angular positional parameter relating to the angular position of the tipper body at the first angular position; and
receive a second pressure parameter relating to the hydraulic pressure within the hydraulic cylinder at a second angular position of the tipper body and a second angular positional parameter relating to the angular position of the tipper body at the second angular position; and
determine the mass parameter relating to the mass of the load in the tipper body based on at least the first pressure parameter and the first angular positional parameter and the second pressure parameter and the second angular positional parameter.

41. A system according to any of Paras 27-40, further comprising:
an input device arranged to receive an operator input to commence an automatic weighing operation; and
a hydraulic cylinder control module arranged to:
upon commencement of an automatic weighing operation:
automatically actuate the hydraulic cylinder to cause the tipper body to move away from a resting position.

42. A system according to Para 41 when appended to Para 40, wherein the hydraulic cylinder control module is arranged to:
upon commencement of the automatic weighing operation:
automatically actuate the hydraulic cylinder to cause the tipper body to move from a resting position to the first angular position;
automatically actuate the hydraulic cylinder to cause the tipper body to move from the first angular position to the second angular position; and
automatically actuate the hydraulic cylinder to cause the tipper body to move from the second angular position to the resting position.

43. A system according to any of Paras 27-42, further comprising a display arranged to display the mass parameter.

44. A system according to Para 43 when appended to Para 41 or 42, wherein the display comprises a touch-screen which comprises the input device.

45. A tipper comprising:
a tipper body pivotably moveable with respect to a frame;
a hydraulic cylinder disposed between the frame and the tipper body and actuatable to pivot the tipper body; and
a weighing system in accordance with any of Paras 27-44 for determining the mass of a load in the tipper body.

46. A tipper according to Para 45 when appended to Para 30, wherein the pressure sensor is mounted to the hydraulic cylinder.

47. A tipper according to Para 45 or 46 when appended to Para 33, wherein the inclination sensor is mounted to the hydraulic cylinder.

48. A tipper according to Para 45 or 46 when appended to Para 34, wherein the inclination sensor is mounted to the tipper body.

49. A tipper vehicle in accordance with any of Paras 45-48.

50. A tipper vehicle according to Para 49 when appended to Para 41 or 42, wherein the input device is located within the cab of the vehicle.

51. A tipper vehicle according to Para 49 or 50 when appended to Para 43, wherein the display is located within the cab.

52. A hydraulic cylinder assembly comprising:
a hydraulic cylinder having at least one pivot axis perpendicular to the longitudinal axis of the cylinder; and
at least one inclination sensor coupled to the hydraulic cylinder such that it is capable of generating a fore-aft inclination parameter relating to the inclination of the cylinder in a plane perpendicular to the pivot axis.

53. A hydraulic cylinder assembly according to Para 52, wherein at least one end of the hydraulic cylinder is provided with an eye which defines the pivot axis.

54. A hydraulic cylinder assembly according to Para 52 or 53, further comprising a pressure sensor coupled to the hydraulic cylinder such that it is capable of generating a pressure parameter relating to the hydraulic pressure within the hydraulic cylinder.

What is claimed is:

1. A method of determining a mass of a load in a tipper body of a tipper, the tipper comprising the tipper body pivotably moveable with respect to a frame with a hydraulic cylinder disposed there between and actuatable to pivot the tipper body, the method comprising:
receiving at least one pressure parameter relating to the hydraulic pressure within the hydraulic cylinder at an angular position of the tipper body and at least one angular positional parameter relating to the angular position of the tipper body at the angular position; and
determining a mass parameter relating to the mass of the load in the tipper body based on at least both the at least one pressure parameter and the at least one angular positional parameter.

2. The method according to claim 1, wherein the mass parameter is determined based on at least the at least one pressure parameter, the at least one angular positional parameter and the position of the centre of gravity of the tipper body, and optionally wherein the method further comprises:
pivoting the tipper body away from a resting position and during the movement of the tipper body:
monitoring the at least one pressure parameter relating to the hydraulic pressure within the hydraulic cylinder to generate a plurality of pressure parameters; and
monitoring the at least one angular positional parameter to generate a plurality of corresponding angular positional parameters; and
determining the mass parameter relating to the mass of the load in the tipper body based on at least the plurality of pressure parameters and the plurality of angular positional parameters.

3. The method according to claim 1, wherein the or each pressure parameter is generated by a pressure sensor which measures the hydraulic pressure within the hydraulic cylinder, optionally wherein the pressure sensor is mounted to the hydraulic cylinder.

4. The method according to claim 1, wherein the or each angular positional parameter is generated by a position sensor.

5. The method according to claim 4, wherein the position sensor comprises an inclination sensor, optionally wherein the inclination sensor measures:
a) an inclination of the hydraulic cylinder and is mounted to the hydraulic cylinder; or
b) an inclination of the tipper body and is mounted to the tipper body.

6. The method according to claim 4, wherein the position sensor comprises a rotary position sensor, optionally wherein the rotary position sensor measures the angular position of:
a) the hydraulic cylinder about a pivot axis of the hydraulic cylinder; or
b) the tipper body about the pivot axis of the hydraulic cylinder.

7. A method according to claim 4, wherein the mass parameter is:
a) mathematically calculated based on the at least one pressure parameter and the at least one angular positional parameter; or
b) empirically determined based on the at least one pressure parameter and the at least one angular positional parameter.

8. The method according to claim 1, wherein the method comprises:
receiving a first pressure parameter relating to the hydraulic pressure within the hydraulic cylinder at a first angular position of the tipper body and a first angular positional parameter relating to the angular position of the tipper body at the first angular position;
receiving a second pressure parameter relating to the hydraulic pressure within the hydraulic cylinder at a second angular position of the tipper body and a second angular positional parameter relating to the angular position of the tipper body at the second angular position; and
determining the mass parameter relating to the mass of the load in the tipper body based on at least the first pressure parameter and the first angular positional parameter and the second pressure parameter and the second angular positional parameter.

9. The method according to claim 8, wherein the first angular position is different from the second angular position, and optionally wherein:
a) both the first angular position and the second angular position are no greater than 10°;
b) both the first angular position and the second angular position are greater than 0°;
c) in both the first angular position and the second angular position the tipper body is pivoted away from a resting position.

10. The method according to claim 8, further comprising actuating the hydraulic cylinder to cause the tipper body to move:
a) from the first angular position to the second angular position; and/or
b) from a resting position to the first angular position.

11. The method according to claim 1, further comprising:
receiving an operator input to commence an automatic weighing operation;
automatically actuating the hydraulic cylinder to cause the tipper body to move from away from a resting position, and optionally further comprising:
automatically actuating the hydraulic cylinder to cause the tipper body to move from away from the resting position to a first angular position;
automatically actuating the hydraulic cylinder to cause the tipper body to move from the first angular position to a second angular position; and
automatically actuating the hydraulic cylinder to cause the tipper body to move from the second angular position to the resting position.

12. A weighing system for determining a mass of a load in a tipper body of a tipper, the tipper comprising the tipper body pivotably moveable with respect to a frame with a hydraulic cylinder disposed therebetween and actuatable to pivot the tipper body, the weighing system
receives at least one pressure parameter relating to the hydraulic pressure within the hydraulic cylinder at an angular position of the tipper body and at least one angular positional parameter relating to the angular position of the tipper body at the angular position; and
determines a mass parameter relating to the mass of the load in the tipper body based on at least the at least one pressure parameter and the at least one angular positional parameter.

13. The weighing system according to claim 12, wherein the weighing system
a) determines the mass parameter based on at least the at least one pressure parameter, the at least one angular positional parameter and the position of the centre of gravity of the tipper body; and/or
b) mathematically calculates the mass parameter or empirically determine the mass parameter.

14. The weighing system according to claim 12, wherein one or more of:
a) the weighing system:
monitors a pressure parameter relating to the hydraulic pressure within the hydraulic cylinder to generate a plurality of pressure parameters during movement of the tipper body away from the resting position; and
monitors an angular positional parameter to generate a plurality of corresponding angular positional parameters during movement of the tipper body away from a resting position; and
determines the mass parameter relating to the mass of the load in the tipper body based on at least the plurality of pressure parameters and the plurality of angular positional parameters; and
b) the weighing system further comprises a pressure sensor arranged to measure the hydraulic pressure within the hydraulic cylinder and generate the or each pressure parameters.

15. The weighing system according to claim 12, further comprising a position sensor for generating each angular positional parameter relating to the angular position of the tipper body, optionally wherein:
a) the position sensor comprises an inclination sensor, the inclination sensor being arranged to measure a inclination of the hydraulic cylinder or a inclination of the tipper body; or
b) the position sensor comprises a rotary position sensor, the rotary position sensor being arranged to measure the angular position of the hydraulic cylinder or the tipper body about a pivot axis of the hydraulic cylinder.

16. The weighing system according to claim 12, wherein the weighing system
receives a first pressure parameter relating to the hydraulic pressure within the hydraulic cylinder at a first angular position of the tipper body and a first angular positional parameter relating to the angular position of the tipper body at the first angular position; and
receives a second pressure parameter relating to the hydraulic pressure within the hydraulic cylinder at a second angular position of the tipper body and a second angular positional parameter relating to the angular position of the tipper body at the second angular position; and
determines the mass parameter relating to the mass of the load in the tipper body based on at least the first pressure parameter and the first angular positional parameter and the second pressure parameter and the second angular positional parameter.

17. The weighing system according to claim 12, further comprising:
an input device arranged to receive an operator input to commence an automatic weighing operation; and
upon commencement of the automatic weighing operation:
automatically actuate the hydraulic cylinder to cause the tipper body to move away from a resting position;
automatically actuate the hydraulic cylinder to cause the tipper body to move from the resting position to a first angular position;
automatically actuate the hydraulic cylinder to cause the tipper body to move from the first angular position to a second angular position; and/or automatically actuate the hydraulic cylinder to cause the tipper body to move from the second angular position to the resting position.

18. A tipper comprising:

a tipper body pivotably moveable with respect to a frame;

a hydraulic cylinder disposed between the frame and the tipper body and actuatable to pivot the tipper body; and a weighing system for determining the mass of a load in the tipper body that receives at least one pressure parameter relating to a hydraulic pressure within the hydraulic cylinder at an angular position of the tipper body and at least one angular positional parameter relating to the angular position of the tipper body at the angular position; and determines a mass parameter relating to the mass of the load in the tipper body based on at least both the at least one pressure parameter and the at least one angular positional parameter.

19. The tipper according to claim 18, wherein:

a) a pressure sensor is mounted to the hydraulic cylinder;

b) an inclination sensor is mounted to the hydraulic cylinder; or c) inclination sensor is mounted to the tipper body.

\* \* \* \* \*